United States Patent [19]

Menard

[11] Patent Number: 4,770,672
[45] Date of Patent: Sep. 13, 1988

[54] LAPPING COMPOUND AND METHOD FOR USING SAME

[76] Inventor: Alfred J. Menard, 1819 N. 198th St., Seattle, Wash. 98133

[21] Appl. No.: 922,860

[22] Filed: Oct. 24, 1986

[51] Int. Cl.[4] .............................................. B24D 3/02
[52] U.S. Cl. ....................................... 51/309; 51/304; 51/308; 252/558
[58] Field of Search .................. 51/293, 304, 308, 309; 252/558

[56] References Cited

U.S. PATENT DOCUMENTS

| | | | |
|---|---|---|---|
| 1,381,728 | 6/1921 | Menard | 51/304 |
| 1,855,195 | 4/1932 | McClaughry | 51/304 |
| 2,889,215 | 6/1959 | Nelson | 51/304 |
| 2,944,879 | 7/1960 | Allen et al. | 51/304 |
| 2,944,880 | 7/1960 | Allen et al. | 51/304 |
| 3,265,475 | 8/1966 | Schantz | 51/304 |
| 3,462,251 | 8/1969 | Whalen et al. | 51/304 |
| 3,618,272 | 11/1971 | Whalen et al. | 51/293 |
| 4,246,003 | 1/1981 | Regler et al. | 51/293 |
| 4,537,709 | 8/1985 | Edge et al. | 252/558 |

Primary Examiner—Paul Lieberman
Assistant Examiner—Willie J. Thompson
Attorney, Agent, or Firm—Hughes, Cassidy & Multer

[57] ABSTRACT

A lapping compound including an abrasive, a detergent and a carrier. The lapping compound is mixed with a lubricating agent and applied to a workpiece surface. The most preferred abrasives are silica for softer metals, and a combination of silica and garnet for harder metals. The preferred detergents are oil based sulfonates, and more preferably sodium dodecylbenzenesulfonate. The preferred carrier is selected from the group consisting of barium sulfate and the barium soaps of fatty acids, the barium soaps having a solubility factor in water of not more than 0.008 grams per cubic centimeter of water, and further being generally insoluble in acid.

10 Claims, 1 Drawing Sheet

LAPPING COMPOUND AND METHOD FOR USING SAME

TECHNICAL FIELD

The present invention pertains to a lapping compound for abrading a metal surface.

BACKGROUND OF THE INVENTION

It is known that lapping compounds are used for smoothing or polishing metal surfaces to remove irregularities such as burrs and high spots on these surfaces. For example, it is important for intermeshing gears that the mating surfaces fit together snugly, but without any binding between them. Sometimes the gears will have high spots which due to the close tolerances between the gears, cause them to bind slightly during operation. To eliminate this binding, it is common practice to apply a lapping compound to the high spot. When the gear surface having the high spot meshes with the opposing gear surface, the lapping compound is rubbed across the high spot causing it to be worn down to the level of the remaining portion of the gear surface. When the desired degree of lap is achieved, the lapping compound is then removed.

Another popular use for a lapping compound is the fitting of soft metal bearings and bushings made from such materials as bronze, brass, babbitt and the like. For example, during the fitting of a bronze bushing to a shaft, the lapping compound is applied to the mating surfaces of the bushing and the shaft. As a result, the rotation of the shaft within the bushing causes the lapping compound to act in a sandpaper-like manner to remove any high spots on the mating surfaces and to permit the shaft to rotate easily inside the bushing.

Due to the extremely small tolerances involved when lapping some metal parts, it is highly desirable to control the amount of lapping. Thus the lapping compound should be easily removable from the lapped surface after the desired amount of lap has been achieved.

A number of lapping and abrading compounds have been disclosed. For example, in U.S. Pat. No. 1,381,728 by Menard, a lapping compound is disclosed which includes potassium carbonate or lead sulfate, sodium and an abrasive.

Another lapping composition is discussed by Nelson in U.S. Pat. No. 2,889,215, in which the composition includes a nonviscous mineral oil, a fatty oil, an oil soluble petroleum sulfonate, grease and an abrasive.

Additional lapping compounds include U.S. Pat. No. 1,855,195 by McClaughry which comprises an abrasive, wax, mineral oil, oil soluble sulfonates, as well as soap and water; and Figiel, U.S. Pat. No. 3,663,475, which discusses a compound including diamond powder, alkyl aryl sulfonates and a petroleum based liquid medium.

Also disclosed are various lubricating compositions including U.S. Pat. No. 2,606,872 by Gasser et al in which a composition having an ash forming metallic detergent is added to a lubricating oil to improve the lubricating properties of the oil.

Liehe, in U.S. Pat. No. 2,394,790 discloses a low soap content grease which includes a sulfonic acid soap.

A lubricating grease is disclosed in U.S. Pat. No. Re. 23,082 by Zimmer et al, which includes a mineral lubricating oil and the reaction product of a salt of an oil soluble sulfonic acid and a salt of another acid.

There is also disclosed in U.S. Pat. No. 1,986,243 by Arveson, a polish for automobiles and furniture which comprises a mild abrasive, and a nonvolatile mineral oil.

SUMMARY OF THE INVENTION

The present invention pertains to a lapping compound for removing metal from a workpiece surface such as from a gear surface. The lapping compound includes an abrasive, an oil miscible detergent, and a carrier selected from the group consisting of barium sulfate and the barium soaps of fatty acids, the barium soaps (i) having a solubility factor in water at 18° C. of not more than 0.008 grams per 100 cubic centimeters of water, and (ii) being generally insoluble in organic or inorganic acids. In a preferred embodiment, the carrier is selected from the group consisting of barium sulfate, barium palmitate, barium laurate, barium stearate and barium myristate; the carrier being present in an amount between about 10 percent and about 50 percent by weight. In addition, the detergent preferably comprises an oil soluble sulfonate, such as the alkyl and aryl sulfonates, and more preferably the detergent comprises sodium dodecylbenzenesulfonate.

For lapping the harder metal surfaces, i.e. those having a hardness greater than or equal to about 30 on the Rockwell C scale, such as hard brass, cast iron and hardened steel, the preferred abrasive is a mixture of silica and garnet. In this mixture, the silica-to-garnet ratio by weight is between about 1:2 and about 1:4, and preferably about 1:3. For the softer metals, those having a Rockwell C hardness of less than about 30, such as copper, aluminum, bronze, babbitt and brass, the preferred abrasive is silica.

In order to apply the lapping compound to a workpiece surface, it is mixed with a lubricating agent. The preferred lubricating agents include petroleum based oils, glycerin and kerosene; the most preferred lubricating agent being a petroleum based oil. The petroleum based oil is added in an amount between about two to about five parts by volume of oil per one part by volume of lapping compound, and preferably about three parts by volume of oil to one part by volume of lapping compound.

The present invention also pertains to a method for lapping a metal surface. The method includes the steps of providing a lapping compound comprising an abrasive, an oil miscible detergent, and a carrier which is selected from the group consisting of barium sulfate and the barium soaps of fatty acids, the barium soaps having a solubility factor in water at 18° C. of not more than 0.008 grams per 100 cubic centimeters of water. The lapping compound is mixed with a petroleum based oil to form a slurry, and the slurry is applied to the metal surface. Additional lapping compound is applied to the workpiece surface when the originally applied compound loses its effectiveness. When the desired amount of lapping has been achieved, the lapping compound is removed. This is accomplished by spraying the metal surface with a solvent such as mineral spirits, diesel oil or stoddard solvent.

An object of the present invention therefore is to provide a lapping compound for removing metal from a workpiece surface.

BRIEF DESCRIPTION OF THE DRAWINGS

These and other objects and advantages of the present invention will become more readily apparent by referring to the following Detailed Description and upon reference to the attached Drawing in which.

Figure 1:
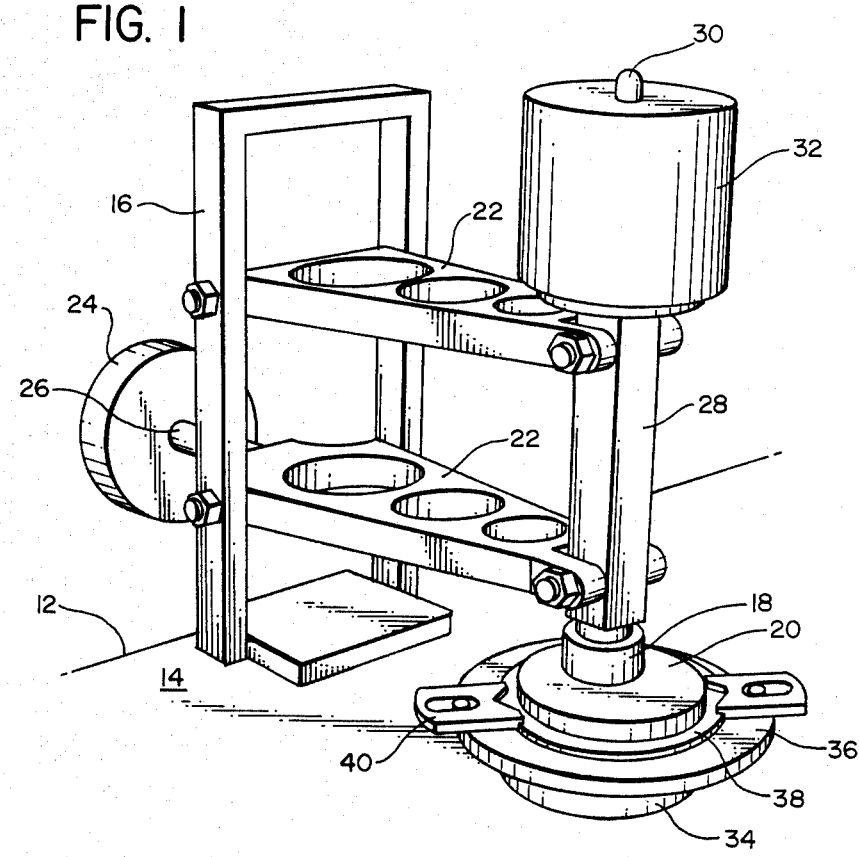
FIG. 1 is an isometric view of an apparatus used to test lapping compounds including the lapping compound of the present invention.

While the present invention is susceptible to various modifications and alternative forms, specific embodiments thereof will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

The present invention pertains to a lapping compound which includes an abrasive, a detergent and a carrier which is selected from the group consisting of barium sulfate and the barium soaps of fatty acids, the barium soaps (i) having a solubility factor in water at 18° C. of not more than 0.008 grams of the barium soap per 100 cubic centimeter of water, and (ii) being generally insoluble in acid. More preferably the carrier is selected from the group consisting of barium sulfate, barium palmitate, barium stearate, barium myristate and barium laurate; and most preferably the carrier is barium sulfate. The lapping compound of the present invention is mixed with a lubricating agent and applied to a metal workpiece surface to remove selected portions of the metal surface. This metal removal is achieved by the mechanical action of the workpiece surface, an opposing surface which engages the workpiece surface, and the lapping compound therebetween. The removal of metal from the workpiece surface is known as "lapping", and is described in further detail in the Background of the Invention.

In order to carry out the present invention there is provided an abrasive for removing metal in a lapping operation. The type of abrasives is a function of the hardness or softness of the metal workpiece; with the preferred "softer" abrasives having a hardness of less than or equal to about 7 on the MOH scale. These softer abrasives are used for lapping softer metals which have a Rockwell C hardness of less than about 30. The most preferred softer abrasive is silica which is used for lapping the most preferred softer metals such as copper, bronze, babbitt, brass and aluminum. For the harder metals, i.e. those having a Rockwell C hardness greater than or equal to about 30, the preferred harder abrasives are those which have a hardness of greater than about 7 MOH. The most preferred harder abrasive is a mixture of silica and garnet in a ratio range between about 1:2 and about 1:4 by weight of silica to garnet for the most preferred harder metals such as hard bronze, cast iron and hardened steel. The abrasives range from about 80 mesh to achieve a coarse lapping action, to about 500 mesh for a fine lapping action. Coarse lapping action is preferred for a more rapid rate of metal removal, whereas a finer lapping action is preferred for slower rates of metal removal and higher removal accuracy with a smoother finish.

The lapping compound, which is in the form of a powder, is mixed with a lubricating agent to form a slurry having a sludge-like consistency. The lubricating agent ensures that the metal surfaces remain lubricated and do not score during lapping. The desired consistency is achieved by the combination of the carrier and a detergent which form a sludge-like slurry which is sufficiently nonviscous to allow the compound to be applied to the metal workpiece, yet which (i) suspends the abrasive somewhat uniformly throughout the slurry, and (ii) adheres to the metal workpiece when subjected to dispersing forces caused by movement of the metal workpiece. More specifically, it is desirable that the abrasive, which is relatively heavy, remain suspended throughout the slurry to achieve a uniform lapping action across the metal workpiece. In the present invention a preferred detergent includes an oil miscible sulfonate such as the alkyl sulfonates and aryl sulfonates, more preferably the detergent is sodium dodecylbenzenesulfonate, and most preferably the detergent is a mixture of sodium dodecylbenzenesulfonate and sodium sulfate. The oil soluble sulfonates are desirabel because they are miscible with the oil to form a lubricating slurry of the desired viscosity, yet they may be removed from the metal workpiece by the application of a solvent.

It has been found that a lapping compound consisting of an abrasive in a detergent-oil mixture may be unsatisfactory because it can result in pronounced scratching of the workpiece surface. Reduction in the amount of abrasive reduces some of the scratching, however the amount of metal removal is also reduced. This requires the use of additional lapping compound which is less economical both in man hours and lapping compound expended. It is also believed that scratching is caused by some of the larger particles in the abrasive which become imbedded in the metal surface. Although these abrasives can be purchased in selected ranges of grain size, sometimes larger particle sizes outside the selected range are also present. To permit the use of a larger proportion of abrasive, and to reduce the effects of having these larger particle sizes, the aforementioned carrier is provided. Although not wishing to be bound by theory, it is believed that the carrier is somewhat selective in that it forms a barrier between the sharp edges of the abrasive which might otherwise become imbedded within the workpiece, yet it leaves a sufficiently rough surface to preserve the abrading properties of the abrasive. It is further believed that these barrier properties of the agent are a result of the barium being a heavy metal.

Surprisingly, it has been further discovered that the presence of the aforementioned carrier improves the metal removal properties of the lapping compound as will be discussed later in Examples 1 and 2.

It is important to note, however, that the preferred carrier, barium sulfate, is a heavy metal compound which is known for its nontoxicity. This is particularly important in view of the fact that the lapping compound of the present invention is processed in powder form, which sometimes causes the particles of the compound to be dispersed into the atmosphere. These particles may be subject to being inhaled or ingested by individuals preparing the compound.

It is also known that all barium compounds that are soluble in water or acid are poisonous. It is believed that the compounds barium sulfate, barium stearate, barium laurate, barium myristate and barium palmitate are either nontoxic or are of sufficiently low toxicity as not to be harmful when being prepared or used in the manner described in the present application.

The lapping compound comprising the abrasive, detergent and carrier is mixed with the lubricating agent to form a sludge-like slurry. The viscosity of the lubricating agent is a function of the tolerance between the workpiece surface and the opposing lapping surface.

For most applications, a lightweight motor oil having a viscosity between 10 SAE and 40 SAE is preferable; however, for use in close tolerances, very nonviscous oils such as kerosene may be used. However, if the lapping compound is to be applied to a high speed gear, then a more viscous oil such as cup grease should be used to prevent the lapping compound from being thrown from the gear as the gear moves. On the other hand, if a water soluble lubricating agent is needed, then the preferred lubricating agent is glycerin.

Mixing the oil with the lapping compound is accomplished by adding between about two to about five parts by volume of lubricating agent per one part by volume of lapping compound, and preferably about three parts by volume of lubricating agent to one part by volume of lapping compound. The resulting sludge-like slurry mixture is then applied directly to the workpiece surface with a conventional applicator such as a paint brush or by pouring the mixture onto the workpiece surface. Typically, it is applied in sufficient thickness to cover the portion of the workpiece surface where metal removal is desired. The rate of metal removal is then observed to gauge whether additional applications are necessary. Furthermore, it is often desirable to apply some of the lubricating agent to the workpiece surfaces prior to applying the lapping compound. This is to ensure that the workpiece surfaces do not become dry or gummy.

In order to prepare the lapping compound in powder form, a commercial abrasive having a known mesh size, such as silica or garnet, is used. Preferably the amount of abrasive is between about 40 percent and about 85 percent by weight per total weight of the lapping compound formed by the abrasive, the detergent and the carrier. More preferably the amount of abrasive is between about 40 percent and about 80 percent by weight per total weight of the lapping compound. Even more preferably, when the harder abrasives are used, the amount of abrasive is between about 70 percent and about 85 percent by weight; with the most preferred amount being about 79 percent by weight. However, when the softer abrasives are used, the amount of abrasive is between about 40 percent and about 55 percent by weight; with the most preferred amount being about 48 percent by weight.

Preferably the weight percent of detergent per total weight of compound is between about 3 percent and about 12 percent, with a more preferred range of detergent being between about 4 percent and about 10 percent by weight. Even more preferably, the amount of detergent in the harder abrasive compound is between about 1 percent and about 10 percent by weight; with the most preferred amount being about 4 percent by weight. In the softer abrasive compounds, the amount of detergent is between about 5 percent and about 15 percent by weight; with the most preferred amount being about 10 percent by weight.

Preferably the amount of carrier is between about 10 percent and about 50 percent by weight per total weight of lapping compound, and more preferably between about 15 percent and about 41 percent by weight. Even more preferably, the amount of carrier in the harder abrasive compound is between about 12 percent and about 20 percent by weight; with an amount of 16 percent by weight being the most preferred. In the softer abrasive compounds, the amount of carrier is between about 35 and about 46 percent by weight; with 41 percent by weight being the most preferred.

To color the lapping compound, it may be desirable to add a coloring agent. The coloring agent may be used to distinguish between different grades of lapping compound.

After the aforementioned materials of the lapping compound are added together, they are mixed, typically by a conventional rotary drum if added in significant quantities, for about an hour or until the coloring agent is distributed uniformly throughout the mixture.

During lapping, the mechanical action of the lapping surface against the workpiece may grind the abrasive into a particle size thereby reducing its lapping effectiveness. In order to continue satisfactory lapping, the used lapping compound is removed from the workpiece surface, and additional unused lapping compound is applied.

In order to further discuss the lapping compound of the present invention, the following examples are provided.

EXAMPLE 1

In run #1, the harder abrasive compound was prepared with 20 grams of a 290 grade silica being added in a container to 4 grams of detergent known as NACCONOL G, a registered trademark, manufactured by Stepan Company of Northfield, Il. and made up of 60 percent by weight sodium dodecylbenzenesulfonate and 40 percent by weight sodium sulfate. Also added to the abrasive and the detergent was 17 grams of a precipitated barium sulfate known as BLANC FIXE manufactured by Sachtleben Duisburg, West Germany, and 4.65 grams of a coloring agent consisting of 20 percent by weight chromium oxide and 80 percent by weight 390 grade silica. The contents were mixed together until the coloring agent was distributed uniformly throughout. Then nineteen grams of the aforementioned mixture were mixed with 25 grams of 120 grade garnet. To test the lapping action of the compound, 44 grams of the above lapping compound was removed from the container and mixed with 17 grams of SAE 10 motor oil. Then 1.5 milliliters of the lapping compound/oil mixture were applied to the upper surface of a circular workpiece made of steel having a Rockwell C hardness of 40, a diameter of 2⅜ inches, and a thickness of ¼ inches.

Testing was performed by a machine built to Applicant's specifications and shown more clearly in FIG. 1. Specifically, the test machine indicated at 10 includes a rectangular support housing 12 having a top surface 14. Extending upward from the top surface 14 is a rectangular support frame 16 which is rigidly connected to the top surface. To support a top lapping member 18 for engaging an underlying metal workpiece disc 20, parallel upper and lower horizontal arms 22 are pivotally connected to the frame 16 and are counterbalanced by a weight 24 mounted on a rod 26 extending rearward from the lower arm. A vertical mounting post 28 is pivotally connected to the outer ends of the upper and lower arms 22 and the lapping member is attached to the bottom of the mounting post 28. Extending upward from the top of the mounting post is a rod 30 upon which is removably inserted one or more selected lapping weights 32 weighing a total of five pounds. The cylindrical lapping member 18 is steel hardened to about 40 Rockwell C and has a diameter of about ¾ inches. Beneath the lapping member is a cylindrical pedestal 34 to which is fastened a circular support disc 36 which holds a lower portion of the workpiece disc by means of clamps 40. The pedestal 34 extends upward through an opening in the base top surface and is connected to a gear assembly within the base. The gear assembly is driven by an electric motor (not shown) which rotates the pedestal at about 150 rpm about its vertical axis, as well as moving the pedestal through a circular path of a varying radius. The pedestal is driven so that the lapping member 18 travels across the surface of the workpiece without repeating the same lapping pattern. In this manner the entire surface of the workpiece is uniformly lapped.

Using the aforementioned machine, the steel workpiece was lapped for a total of nine minutes; however, after each three minutes, the used lapping compound was removed and unused lapping compound was applied to the workpiece. During testing, the lapping compound was continuously scraped toward the center of the workpiece to counteract its outward movement resulting from rotation of the workpiece. In run #1, 0.120 grams of steel were removed from the workpiece as determined by weighing the workpiece 20 before and after lapping. After completion of lapping, small scratches were observed on the surface of the steel workpiece.

As a comparison, a test was made utilizing the aforementioned lapping compound in which there was no carrier present.

EXAMPLE 2

In run #2, the harder abrasive compound was prepared with 50 grams of a 290 grade silica being added in a container to 10 grams of NACCONOL G detergent together with 11.5 grams of the coloring agent consisting of 20 percent by weight chromium oxide and 80 percent by weight 390 grade silica. The contents were mixed until the coloring agent was distributed uniformly through the mixture. Then 19 grams of the aforementioned mixture was mixed with 25 grams of 120 grade garnet. To test the lapping action of the compound, 44 grams of the above lapping compound was removed from the container and mixed with 17 grams of SAE 10 motor oil. Then 1.5 milliliters of the compound/oil mixture were applied to the upper surface of a circular steel workpiece having a Rockwell C hardness of 40, and having a diameter of 2⅜ inches and a thickness of ¼ inches. The testing was then performed on the machine and in the manner described in Example 1. After nine minutes of lapping, it was determined that 0.030 grams of steel were removed from the workpiece as determined by weighing the workpiece before and after lapping.

It was therefore apparent by the tests performed in Example 1 and 2 that the presence of the barium sulfate significantly improved the metal removal qualities of the lapping compound.

What is claimed is:
1. An oil miscible lapping compound comprising:
 a. an abrasive;
 b. an oil miscible detergent; and
 c. barium sulfate;
 d. the abrasive, the detergent, and the barium sulfate each being present in an effective amount.
2. The lapping compound as set forth in claim 1 wherein the percentage by weight of barium sulfate per total weight of the lapping compound is between about 10 percent and about 50 percent.
3. The lapping compound as set forth in claim 1 wherein the detergent comprises an oil miscible sulfonate.
4. The lapping compound as set forth in claim 1 wherein the detergent is sodium dodecylbenzenesulfonate.
5. The lapping compound as set forth in claim 1 wherein the detergent is a mixture of sodium dodecylbenzenesulfonate and sodium sulfate.
6. The lapping compound as set forth in claim 4 wherein the abrasive is silica.
7. The lapping compound as set forth in claim 1 additionally comprising a petroleum based lubricating agent.
8. An oil miscible lapping compound comprising:
 a. an abrasive which consists essentially of silica in an amount ranging between about 40 percent and about 55 percent by weight;
 b. sodium dodecylbenzenesulfonate in an amount ranging between about 5 percent and about 15 percent by weight; and
 c. barium sulfate in an amount ranging between about 35 percent and about 46 percent by weight.
9. An oil miscible lapping compound comprising:
 a. an abrasive which is a mixture of garnet and silica in a ratio of garnet to silica ranging between about 2:1 and about 4:1 by weight, said abrasive being present in an amount ranging between about 70 percent and about 85 percent by weight;
 b. an oil miscible detergent; and
 c. barium sulfate in an amount ranging between about 12 percent and about 20 percent by weight.
10. An oil miscible lapping compound which comprises:
 a. from about 40 to about 80 weight percent of an abrasive which is silica or garnet or a mixture of silica and garnet;
 b. from about 3 to about 12 weight percent of an oil miscible detergent; and
 c. from about 10 to about 50 weight percent of a precipitated, essentially contaminmant free barium sulfate.

* * * * *

UNITED STATES PATENT AND TRADEMARK OFFICE
CERTIFICATE OF CORRECTION

PATENT NO. : 4,770,672
DATED : September 13, 1988
INVENTOR(S) : Alfred J. Menard It is certified that error appears in the above-identified patent and that said Letters Patent is hereby corrected as shown below:

Column 3, line 21, "centimeter" should read --centimeters--.

Column 3, line 38, "abrasives" should read --abrasive--.

Signed and Sealed this

Fourteenth Day of February, 1989

*Attest:*

DONALD J. QUIGG

*Attesting Officer*     *Commissioner of Patents and Trademarks*